United States Patent [19]

Vanderzanden et al.

[11] 4,142,606
[45] Mar. 6, 1979

[54] EXHAUST GAS DIFFUSER

[75] Inventors: Allan J. Vanderzanden, Cornelius; Max K. Ozawa, Portland, both of Oreg.

[73] Assignee: Hyster Company, Portland, Oreg.

[21] Appl. No.: 736,424

[22] Filed: Oct. 28, 1976

[51] Int. Cl.$^2$ ............................. F01N 3/02; F01N 3/06
[52] U.S. Cl. ................................ 181/231; 181/262; 181/239; 181/272; 181/275
[58] Field of Search ............... 181/212, 220, 228, 238, 181/231, 264, 265, 269, 275, 259, 229, 232, 239, 262, 263, 272, 273

[56] References Cited

U.S. PATENT DOCUMENTS

| | | | |
|---|---|---|---|
| 706,844 | 8/1902 | Motsinger | 181/239 |
| 2,829,731 | 4/1958 | Clayton | 181/212 |
| 3,471,265 | 10/1969 | Ciapetta et al. | 181/259 |
| 3,685,615 | 8/1972 | Rutt | 181/232 |

*Primary Examiner*—L. T. Hix
*Assistant Examiner*—Benjamin R. Fuller
*Attorney, Agent, or Firm*—Francis L. Swanson

[57] ABSTRACT

A system for diffusing exhaust gases and controlling and suppressing backfire in an industrial truck is disclosed. Exhaust gases from the truck engine are first passed through a spark arresting muffler to remove hot, solid particles from the gas stream. The gases are then routed to a diffuser which is mounted on the truck's overhead guard. The diffuser contains a venturi and an air intake manifold to mix outside air with the gas stream and complete the ignition of unburned backfire gases. The diffuser includes a transverse diffusion chamber for substantially containing and burning backfires therein and a series of thin exit pipes for dispersing the gases and quenching exiting flames produced by the backfires within the chamber.

9 Claims, 4 Drawing Figures

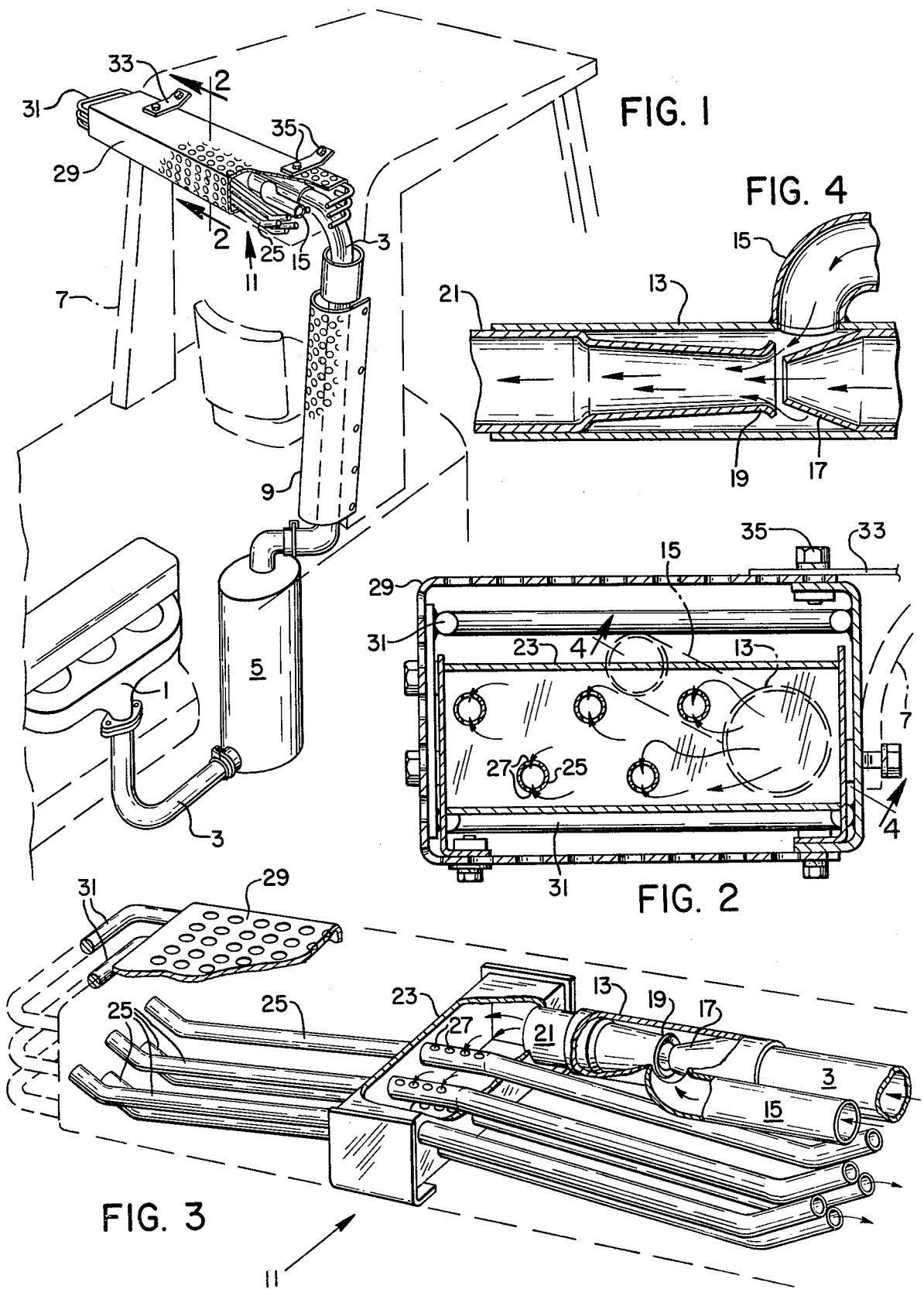

EXHAUST GAS DIFFUSER

BACKGROUND OF THE INVENTION

1. Field of the Invention

This invention pertains to engine exhaust gas systems in general and more particularly to those which include a gas diffuser in addition to a muffler.

2. DESCRIPTION OF THE PRIOR ART

Numerous exhaust gas systems exist in the prior art. Many use mufflers which are designed to arrest sparks and remove solid particles. Others employ air jets to dilute exhaust gases. One such embodiment is shown in U.S. Pat. No. 3,186,511, to Kliewer.

OBJECTS OF THE INVENTION

A principal object of the invention is to provide a diffusion and backfire suppression device for igniting and burning backfire gases in a controlled manner.

A further object of the invention is to provide a diffuser which includes a plurality of thin fire quenching pipes and a diffusion chamber which will quench backfires and contain burning of the backfire gases within the diffusion chamber.

A further object of the invention is to provide a mechanism to diffuse, cool quench and dilute exhaust gases and eject them away from the operator of the industrial truck.

A further object of the invention is to provide a system which removes solid particles and sparks from the exhaust gas stream and which adds ambient air to the gas stream to rapidly cool ejected gases.

Other objects and advantages will become apparent to those skilled in the art with reference to the accompanying drawings and specification.

BRIEF DESCRIPTION OF THE DRAWINGS

FIG. 1 is a perspective view of the diffuser partially broken away to show internal construction. The device is shown mounted on an industrial truck overhead guard; the truck and guard are illustrated in phantom.

FIG. 2 is a section view taken along line 2—2 of FIG. 1.

FIG. 3 is a perspective view of the diffuser broken away to show details of internal construction.

FIG. 4 is a section view taken along line 4—4 of FIG. 2.

DETAILED DESCRIPTION

Referring now to the drawings, FIG. 1 shows an industrial truck illustrated in phantom. The truck has an engine with an exhaust manifold (1) to which is attached an exhaust pipe (3). Pipe (3) is attached to a spark arresting muffler (5). Pipe (3) continues on from muffler (59 vertically along the truck overhead guard (7). Pipe (3) is surrounded by a shield (9) attached to guard (7). The shield is intended to prevent contact with pipe (3) during operation of the engine. At its upper end, pipe (3) curves across the top rear of overhead guard (7) and into diffuser (11).

Within diffuser (11) is an air mixing chamber (13) having an intake pipe (15) attached thereto. Pipe (3) terminates within chamber (13) and the end of pipe (3) is tapered to define a nozzle (17). The nozzle (17) directs gases into a venturi (19) formed in one end of tube (21). As shown in FIG. 4, venturi (19) and nozzle (17) are positioned adjacent the point where pipe (15) opens into air chamber (13). Tube (21) projects out of chamber (13) and is connected to a diffusion chamber (23) which is a closed rectangular member mounted transverse to the longitudinal axis of the diffuser (11). Chamber (23) acts as a backfire containing chamber for burning backfire gases in a manner to be described below.

Within and protruding from diffusion chamber (23), are a series of long, thin gas exit pipes (25) which quench backfire gases exiting from chamber (23). Each pipe (25) is perforated with a series of holes (27) within the chamber (23). Outside chamber (23), the pipes (25) are not perforated. The outer ends of each pipe (25) are bent upward to expell gases through each end of diffuser (11), above the overhead guard (7) and away from the truck operator. The pipes (25), the diffusion chamber (23), air mixing chamber (13), and intake pipe (15) are all surrounded and supported on the overhead guard (7) by a perforated protective cover (29). The cover (29) has, at each end, a plurality of curved protective bars (31). The cover (29) is attached to the guard (7) by brackets (33) and secured with bolts (35).

OPERATION

When the engine is running, hot exhaust gases move through manifold (1) and pipe (3) into the spark arresting muffler (5) where hot, solid particles are trapped and removed from the gas stream. The exhaust gas then proceeds from muffler (5) upward through pipe (3) into air mixing chamber (13) where ambient air coming in through intake pipe (15), is mixed with the gas stream. This addition and mixing is accomplished by the combination of the nozzle (17) and venturi (19) within chamber (13). A drop in pressure within the moving gas stream is created by the venturi and nozzle. This causes ambient air to be drawn through pipe (15) into chamber (13) and into the gas stream through the gap between nozzle (17) and venturi (19). The air-gas mixture then moves into tube (21).

This addition of air serves multiple purposes. One is to cool the gas stream. Another is to add air to the gas stream to cause complete ignition of backfires within the venturi (19) when the backfires have been initiated within the engine and pass into the exhaust system.

In some instances backfires initiated by an internal combustion engine do not begin to burn until more air is added to the mixture. This is because the air-fuel mixture, although hot, is too rich to support combustion. However, once more air is added, the mixture becomes lean enough to ignite. In conventional systems, ignition may take place in the muffler or tail pipe causing flames to shoot out of the tail pipe into the surrounding atmosphere, accompanied by a loud explosion.

In the present invention, air is added in a controlled manner under the influence of the venturi (19) and nozzle (17) in the air mixing chamber (1), completing ignition of gases in venturi (19). The ignited backfire gases then move into and burn within the diffusion chamber (23). Being relatively large, chamber (23) effectively traps and contains the burning backfire gases where they rapidly expand and burn. This produces controlled burning rather than an explosion. This controlled burning eliminates the loud explosive report typically associated with backfire. The backfires are thus effectively suppressed. The burned gases within the diffusion chamber (23) then pass into the small holes in the pipes (25) and through the pipes on out of the diffuser (11).

The small diameter and long length of the pipes (25) further aid to quenching the ignited backfires by restricting any still burning gases exiting from diffusion chamber (23) to small diameter, pencil-like flames which can easily be contained and quenched entirely within the structure of diffuser (11). The surrounding atmosphere at the pipe ends acts as a heat sink to rapidly quench such flames.

The wide spacing of pipes (25) further promote cooling along the pipe length. Since the tubes are of small diameter, the gases are ejected at high velocity which additionally promotes cooling, mixing and dilution.

The upwardly bent ends of pipes (25) direct the burned gases through the ends of diffuser (11) around curved bars (31) and away from the truck operator. The gases thus ejected are at a temperature only moderately above that of the ambient air and sparks and particles have been removed.

The illustrated construction completes ignition of backfire gases in the venturi (19) which burn out within the diffusion chamber (23); all within diffuser (11), so that little or no flames escape into the surrounding air. Backfires are thus effectively suppressed and diffused.

Having disclosed the preferred embodiment of the invention and having described it in detail, it will be apparent to those skilled in the art that many modifications could be made thereto without departing from the true spirit and scope of the invention. We claim as our invention all such modifications as fall within the scope of the appended claims.

We claim:

1. An exhaust gas diffuser and backfire suppressor comprising:
   an air mixing chamber connected to a source of exhaust gas for adding, cooling and diluting air to said gases;
   a tube connecting the air mixing chamber to a combination gas diffusion and backfire containing chamber separate from the mixing chamber;
   and a plurality of thin, elongate, fire quenching pipes connected to the combination diffusion and backfire containing chamber for directing the gases exiting from said chamber to the atmosphere.

2. Apparatus according to claim 1 wherein the air mixing chamber is separate from the diffusion chamber and is operative to ignite backfires initiated by the source of exhaust gases outside the diffusion chamber.

3. Apparatus according to claim 2 wherein the air mixing chamber contains a nozzle and a venturi positioned adjacent an air intake pipe so that air is drawn into the venturi and mixed with exhaust gases to dilute and cool said gases and to ignite backfires initiated by the gas source outside the diffusion chamber, the gases then being routed to the diffusion chamber.

4. Apparatus according to claim 1 wherein the diffuser includes an elongate cover defining a longitudinal central axis and the diffusion chamber comprises an elongate closed box mounted transverse to the longitudinal axis of the diffuser cover, the box connected at one end to the air mixing chamber and adapted to contain burning gases;
   the diffusion chamber including a plurality of thin, elongate, fire quenching pipes protruding through said diffusion chamber normal to the longitudinal axis of the chamber.

5. Apparatus according to claim 4 wherein the walls of the pipes have a series of perforations only in that portion of said pipes lying within the diffusion chamber;
   the surface of the pipes outside the diffusing chamber being imperforated and adapted to cool and quench flames emerging from the diffusion chamber.

6. Apparatus according to claim 4 wherein each pipe protrudes through the diffusion chamber so that a substantially extended imperforated pipe lies on each side of the chamber.

7. Apparatus according to claim 6 wherein the ends of each exit pipe are bent angularly so that gases flowing out of each pipe are directed through the ends of the diffuser.

8. An exhaust gas diffuser and backfire suppressor comprising:
   an air mixing chamber having an air intake pipe, the mixing chamber operatively connected to a source of exhaust gas;
   a venturi and a nozzle within the mixing chamber mounted adjacent to the intersect of the air intake pipe and the chamber for drawing ambient air into the gas stream;
   a tube connecting the air mixing chamber to a separate combination gas diffusion and backfire suppression chamber;
   The combination diffusion and suppression chamber comprising an elongate, hollow member with closed ends separate from the mixing chamber and having a plurality of thin, elongate fire quenching and gas cooling pipes protruding from the diffusion chamber for dividing exiting exhaust gases into small streams and out of the diffusion chamber.

9. An exhaust gas diffuser and backfire suppressor comprising:
   an air mixing chamber, the chamber including an intake pipe for drawing ambient air into the chamber;
   a pipe connected to an exhaust gas source, the pipe defining a nozzle;
   a tube defining a venturi at one end thereof;
   the venturi and nozzle connected to and contained within the air mixing chamber and operative to ignite backfires initiated by the gas source within the mixing chamber;
   the tube extending out of the air mixing chamber and connected to a combination diffusion and backfire suppression chamber, the diffusion and suppression chamber adapted to disperse exhaust gases and to contain and disperse burning gases resulting from backfires ignited in the air mixing chamber;
   the combination diffusion and suppression chamber comprising an elongated, hollow, closed body transverse to the longitudinal axis of the diffuser;
   and a plurality of elongate fire quenching pipes protruding through the diffusion and suppression chamber, the pipes having open outer surfaces within the combination diffusion and suppression chamber and closed outer surfaces outside the diffusion and suppression chamber so that flames are quenched and exhaust gases are separated into small high velocity streams, cooled and directed out of the diffusion and suppression chamber by the pipes.

* * * * *